US012542823B2

(12) United States Patent
Ward et al.

(10) Patent No.: US 12,542,823 B2
(45) Date of Patent: Feb. 3, 2026

(54) SMART IoT DEVICE NOTIFICATION AND COMMUNICATION SYSTEM

(71) Applicant: LUMENLY LAMPS, INC, Wilmington, DE (US)

(72) Inventors: Deidre Ward, Haymarket, VA (US); Kenny Fok, San Diego, CA (US)

(73) Assignee: LUMENLY LAMPS, inc, Wilmington, DE (US)

( * ) Notice: Subject to any disclaimer, the term of this patent is extended or adjusted under 35 U.S.C. 154(b) by 146 days.

(21) Appl. No.: 18/524,765

(22) Filed: Nov. 30, 2023

(65) Prior Publication Data

US 2024/0187475 A1 Jun. 6, 2024

Related U.S. Application Data

(60) Provisional application No. 63/429,233, filed on Dec. 1, 2022.

(51) Int. Cl.
*H04L 67/025* (2022.01)
*G16Y 40/35* (2020.01)

(52) U.S. Cl.
CPC ............ *H04L 67/025* (2013.01); *G16Y 40/35* (2020.01)

(58) Field of Classification Search
CPC ........ G16Y 40/35; H04L 67/025; H04L 67/12
See application file for complete search history.

(56) References Cited

U.S. PATENT DOCUMENTS

| | | | |
|---|---|---|---|
| 10,003,654 B2 * | 6/2018 | Chen | H04L 67/125 |
| 11,394,619 B1 * | 7/2022 | Chalmers | H04L 63/105 |
| 11,632,428 B2 * | 4/2023 | Tikhomirov | H04L 67/12 709/220 |
| 2016/0036819 A1 * | 2/2016 | Zehavi | H04L 67/12 726/4 |
| 2019/0373649 A1 * | 12/2019 | Magadevan | H04W 92/18 |
| 2020/0092376 A1 * | 3/2020 | Morris | H04W 4/70 |

* cited by examiner

*Primary Examiner* — Jason D Recek
(74) *Attorney, Agent, or Firm* — Thomas D. Foster; Jonathan Kidney

(57) ABSTRACT

An IoT communication system and method with a network-connected server running an IoT application. And connected to one or more originating IoT devices and target IoT devices having first and second responses, respectively. The IoT application generates a data object containing information of at least one of text, the first response, video, and image corresponding to an initiating user's action, and has a translator, converting information in the data object to a form operable by the target IoT device(s) if the second response does not match the first response. The system also has an IoT App installed on a target user's smart device, connected to network and provides a notification to the target user of information in the data object. The system and method can also receive machine/API input and forward (with or without translation) to the respective IoT devices. As well as coordinate secure communication via an encrypted network.

19 Claims, 5 Drawing Sheets

SMART IoT DEVICE NOTIFICATION AND COMMUNICATION SYSTEM

CROSS-REFERENCE TO RELATED APPLICATION(S)

This application claims the benefit of U.S. Provisional Patent Application No. 63/429,233, filed Dec. 1, 2022, the contents of which are hereby incorporated by reference in its entirety.

FIELD

This invention relates to an Internet of Things (IoT) communication system and methodology. More particularly, it is directed to an intelligent IoT communications and management system across a plurality of IoT devices, particularly for non-similar devices.

BACKGROUND

A communicative IoT (Internet of Things) system is typically defined as a system to communicate some sort of human-understandable message from one IoT device to a group of IoT devices. For example, tapping on a touch-capable IoT picture frame can trigger the device to send a pre-set picture (e.g., a family photo) to a group of IoT picture frames (e.g., owned by other family members). As a result, all the picture frames within the family group displays the "sent" family photo. Or, tapping on a touch-capable IoT lamp triggers the device to send a pre-set color (e.g., Blue) from a given user to a group of IoT lamps. As a result, all the lamps within the group displays the blue light.

The above system is primarily designed under the following constraining assumptions:
1. A limited number of members are in the group.
2. A user belongs to a limited number of groups.
3. The group contains a collection of the same IoT devices.

However, as more users enter or use this kind of system, the above assumptions may no longer be valid causing operational failures across the groups, devices, members. For case 1, for example, when a group of lamps has, say, more than 20 members and a color change associated with a given user is triggered by that given user for all the lamps, most users probably do not remember which color is associated with which user. This negates the primary purpose of such a method of communication.

For case 2, for example, when a user has more than, say, 5 groups (Family, Work, Cousins, GrandFather-side, GrandMother-side, . . . ), and each group has different sets of members and associated colors. If a color change is triggered in all the lamps, the users probably do not know which group is triggering the color change.

For case 3, for example, for different types of IoT devices (with different capabilities) within a common system. If a family member "Grandparents" does not want a picture frame IoT device, but prefers a lamp IoT device, while all the other members in the group have a picture frame IoT device? How can the Grandparents' device properly communicate to/from the other member's different IoT devices?

In view of the above, various approaches and systems and methods are elucidated to address the shortcomings of current "dumb" IoT systems, as detailed below.

SUMMARY OF THE INVENTION

The above problems can be addressed by utilizing a Smart Communicative IoT System (SCIS). Generally, for every "message" communicating from one IoT device to another IoT device, the "message" is defined as/into data objects or data containers (and modified as such if needed). Such data objects can include multiple data types such as, operation (or operational mode) of the IoT device (e.g., color of the lamp), status, IoT device identifier, text message, audio clip, picture, video, pointers, URL, address, owner-id, group-id, etc. These data objects can be translated from one IoT (having a set of characteristics) to another IoT (having a non-similar set of characteristics) by the SCIS to enable appropriate communication between disparate IoT devices or for analogous sets of devices, groups, arrangements, etc.

For example, in one aspect of an embodiment, an IoT communication system is provided, comprising: a first network with a server running an IoT application; an originating IoT device having a first response, connected to the first network and in communication to the IoT application, wherein the first response is triggered by an initiating user's action on the originating IoT device; a target IoT device having a second response, connected to the first network and in communication to the IoT application; a data object containing information of at least one of text, the first response, video, and image corresponding to the initiating user's action; a translator, providing a conversion of information in the data object to a form operable by the target IoT device if the second response does not match the first response; an IoT App installed on a target user's smart device, connected to the first network and providing a notification to the target user of information in the data object.

In another aspect an embodiment, the above system is provided, further comprising a non-human-generated third response, connected to the first network, wherein the data object further includes the third response and the translator operates on the third response if not matching to the second response; and/or further comprising an application programming interface (API) to trigger the third response; and/or wherein the third response contains information of at least one of weather, stocks, sports, finances, traffic, emergency, security and event change; and/or further comprising a plurality of target IoT devices, wherein a subset of the plurality of target IoT devices have non-matching responses; and/or wherein the first network is an Internet Cloud; and/or comprising a second network, the second network having at least one of a security protocol and key different from the first network, and also connected to the IoT App; and/or further comprising a non-human-generated third response, connected to the first and second networks, wherein the data object includes the third response and the translator operates on the third response if not matching to the second response; and/or wherein first and second network provide enhanced security due to the IoT application choosing which network to use upon a breach of the first network; and/or wherein the smart device is a smart phone; and/or wherein the originating IoT device is an IoT lamp, or IoT picture frame, or IoT display, or IoT speaker, or IoT microphone, or IoT smartphone, and the plurality of target IoT devices contains at least one of an IoT lamp, IoT picture frame, IoT display, IoT speaker, IoT microphone, and IoT smartphone; and/or further comprising a reminder from the originating IoT device and communicated by the IoT application to at least one of the originating IoT device and to the IoT App.

In yet another aspect of an embodiment, an IoT device communication method is provided, comprising: running an IoT application on a server connected to a first network; triggering a first response of an originating IoT device from an initiating user's action, the originating IoT device being connected to the first network; communicating the first response to the IoT application; encapsulating at least one of text, the first response, video, and image corresponding to the initiating user's action into a data object; translating information in the data object to a format compatible with one or more target IoT devices, connected to the network, if a second response of the one or more target IoT devices does not match the first response; communicating at least the first response and translated first response to the one or more target IoT devices; and sending a notification to an IoT App installed on a target user's smart device, of information in the data object.

In yet another aspect of an embodiment, the above method is provided, further comprising connecting a second secure network having a different protocol from the first network to the IoT application, originating IoT device, one or more target IoT device, and IoT App; and/or further comprising choosing between the first and second network as a primary communication path based on a determination of a security breach from the first network; and/or further comprising: connecting a non-human initiating source to the first network; sending a third response from the non-human initiating source to the IoT application; encapsulating the third response into the data object; translating the third response if not matching to the second response; and communicating at least the third response and translated third response to the one or more target IoT devices; and/or further comprising triggering the third response from an application programming interface (API) running on the non-human initiating source; and/or wherein the triggering is based on a threshold determination from at least one of weather, stocks, sports, finances, traffic, emergency, security and event change; and/or further comprising: receiving a reminder from the originating IoT device; and communicating the reminder from the IoT application to at least one of the originating IoT device and a secondary device of the initiating user, at a predetermined time; and/or wherein the originating IoT device is an IoT lamp, or IoT picture frame, or IoT display, or IoT speaker, or IoT microphone, or IoT smartphone, and the one or more target IoT devices contains at least one an IoT lamp, IoT picture frame, IoT display, IoT speaker, IoT microphone, and IoT smartphone.

DETAILED DESCRIPTION

Figure 1:
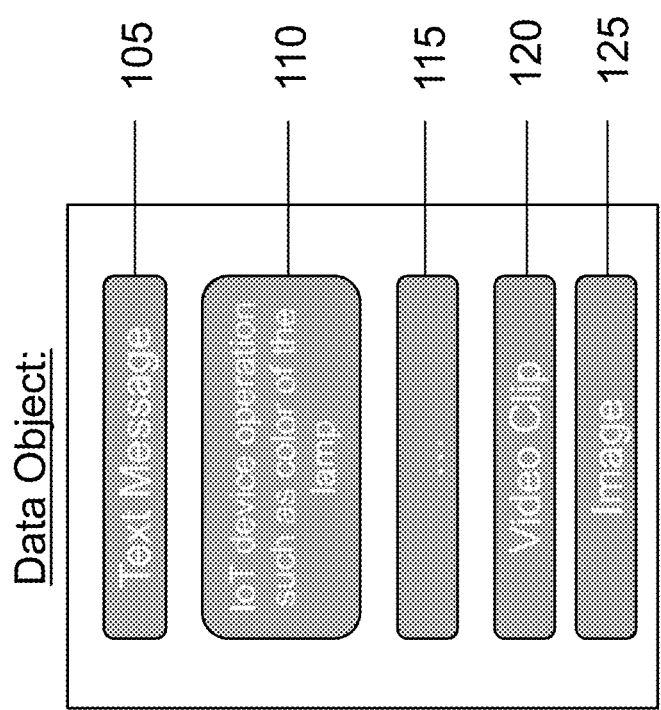
FIG. 1 is a sample illustration of an IoT data object or container, listing only a few of the possible types of information in the object.

FIG. 1 is a sample illustration 100 of data object or container, listing only a few of the possible types of information in the object. The data object 100 is shown here as one form for containing or encapsulating specified information for the exemplary system. For example, the data container 100 may have one or more of a text message 105, IoT device operation parameter 110, optional as-yet-undefined information 115 (or redirection parameter), video clip 120, image 125, and etc. In some embodiments, a data object 100 may be linked to a secondary (or additional one or more data object—not shown) so as to have the information, in whole or in part, distributed over several "linked" data objects.

In some aspects of the invention, the data container attributes can originate from the user's IoT device as being preconfigured with the additional information. For example, a "smart" IoT device may have sufficient enough data container information for the SCIS system to proceed. This could also be via an App installed on a smart phone (or equivalent). In other embodiments, the originating IoT device may not be "smart," requiring the SCIS system to "build" the data container having the additional information needed for proper translation within the SCIS system.

Figure 2:
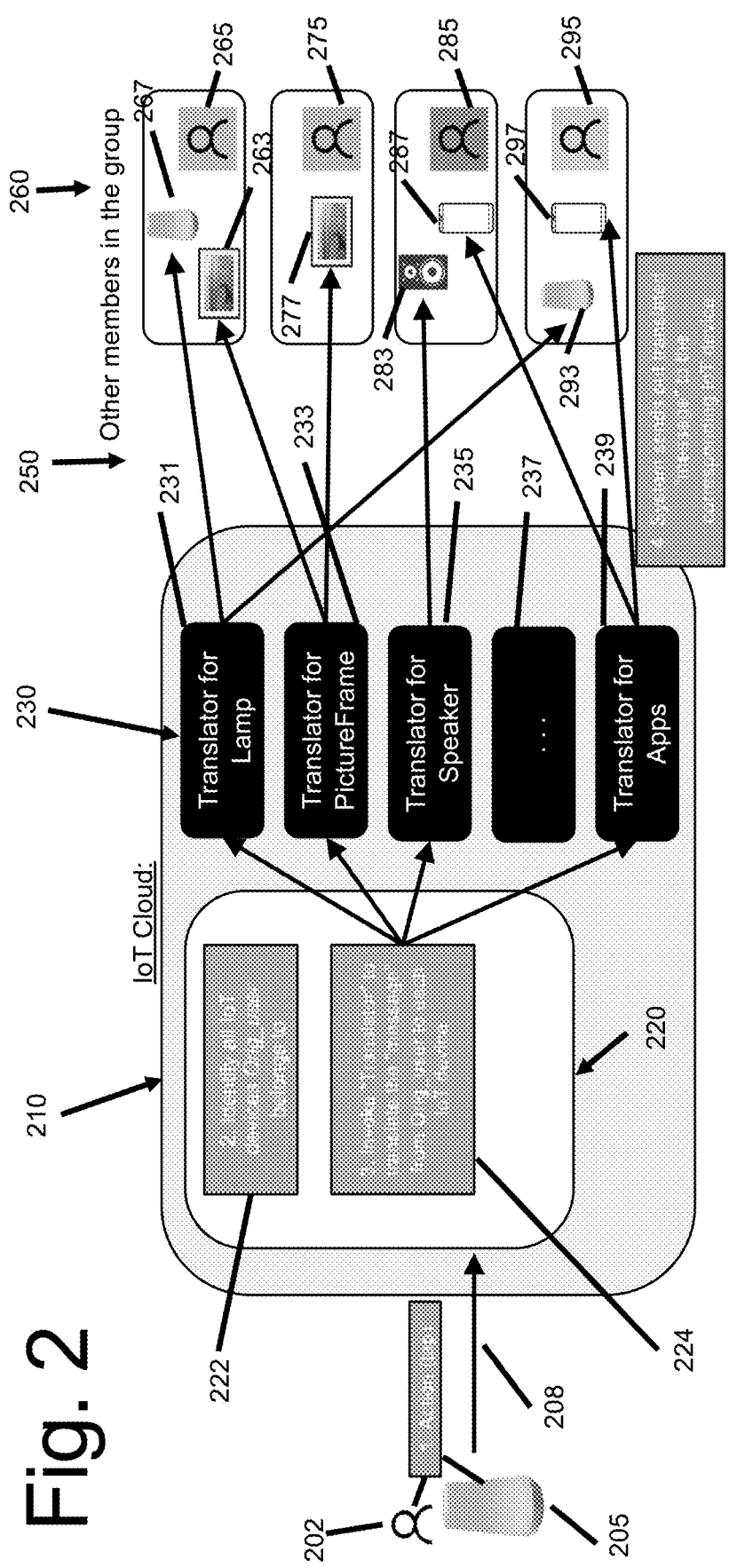
FIG. 2 is a block diagram illustration showing an exemplary SCIS IoT configuration using the various data objects and translator capabilities to convey information, etc. to a variety of IoT devices and their users.

FIG. 2 is a block diagram 200 showing an exemplary SCIS IoT configuration using the various data objects and translator capabilities to convey information, etc. to a variety of IoT devices and their users. Shown are general elements and general paths in an exemplary SCIS system's translation structure, for a group of IoT devices with different capabilities—e.g., Lamp, Picture Frame, Speaker, etc.

It is expressly understood that IoT devices are network-connected (e.g., Internet Cloud) and therefore, support services from an Internet server or computing device connected to the Internet are explicit in the SCIS system. Similarly, mobile devices such as a smart phones, tablets, pods, smart watches, etc. as well as smart TVs, and so forth are able to connect to the Internet and by virtue of an SCIS App (integrated into the device or installed as a software app) can communicate to IoT devices operating under the SCIS system. The SCIS system can be hosted on a remote server (e.g., cloud) and have SCIS software running to provide SCIS services to respective connected devices.

If the receiving IoT device does not have the appropriate capability to "consume" or process correctly, or perform the requested instruction or action in the supplied data object, then the SCIS applies a smart translation for delivering some form of human-understandable content based on:

a. Data type of the original data object, and/or
b. The capabilities of each receiving IoT device; and/or
c. Personal settings of the sender.

Other conditions or parameters are possible, depending on design and implementation objectives. The "translation" capability enables a non-compatible data type or data object to be processed by the non-matching IoT device in a manner that is useable by the non-matching IoT device, and allow that translated "information" to be presented (directly or indirectly) to the end user. To assist in this capability, the SCIS can also have a mobile App/Desktop App as part of the end-point delivery scheme. So, while the end-IoT device may respond in a translated (e.g., altered) manner, the App may show the original data object or instruction to the end user via the App. In this manner, a user can have multiple IoT devices, some being different in capabilities, without having to worry or be concerned on messaging compatibility problems between the different devices. For example, a user can have an SCIS system with an IoT Lamp, IoT Picture Frame or Display, and IoT Speaker along with Apps—all of which can "speak" to each other under the translation capability and with App transparency, to show, if desired, the original or intended information being translated.

Some possible variations of the above exemplary approaches are detailed in the following Figs. One simple variation is that User Interface sequences and user-programming, selections could be a good differentiator, for example:

Tap Sequence—certain sequences send predefined messages to the other person's app Touch Type—a slide vs. a tap, 2 fingers vs. 1, etc.

Key Words—certain words or sounds could trigger an operational mode or command.

Combinations of the Above—touch with sounds, e.g., a touch (type) could indicate a command instruction mode, and the sound/voice could be the instruction being given.

Of course, the SCIS App could also facilitate these or different responses, if so desired, by appropriate configuration by the user. Icon displays or preprogrammed images could be displayed on a Picture Frame, or a light color/modulation on a Lamp, or a frequency, tone, phrase for a Speaker. As a non-limiting example, a Picture Frame could show an image of a fork & knife with a timer/clock to indicate an upcoming lunch appointment. A Speaker would "ding" upon nearing the lunch time and give an audible reminder of who the lunch is with, where, etc. The lamp could flash rapidly shortly in advance of the scheduled lunch. Some forms of the notifications could be "hard" (audible voice) notifications while others could be "soft" (slight dimming of light), depending on the user preference—or from a system default preference. As a non-limiting example, in a home meeting environment, to avoid disturbing an on-going meeting, a light in the back could dim and brighten slowly within the room while the SCIS app on the user's smartphone, smart watch, etc. would alert the user with details to the nature of the alert. Confirmation of the receipt of the message could also be initiated by the user—turning off the notification, if so desired.

In the example of FIG. 2, a user 202 "taps" 205 their arbitrary IoT device (not shown) to send an action via communication link 208 to SCIS system 210 running in a network, for example an accessible cloud. The SCIS system 210 can be hosted on server(s)—not shown—in the cloud. The SCIS system 210 contains modules or software routines 220, wherein submodule 222 first identifies the IoT device sending the action as being linked to user 202. If multiple devices are associated with the user 202, the "action" received is correlated to the appropriate user's device that sent the action, within this submodule 222. If the user 202 is associated with other users, then their devices (users) could now be identified as part of user 202's "group" 260.

Next, for multiple devices and/or users (in matched group(s)), a Translator submodule 224 translates the message or action identified in submodule 222, to be compatible or translated to the various other devices associated with the user 202 or user-group. For example, in one scenario, the user 202 can target an action to one of his own devices (in another room, house, location) and a translation may be needed. In other scenarios, the action is targeted to another user's device and translation may be needed.

Functional operations of the Translator submodule are shown in an expanded block layout 230, shown here as a plurality of translators. For example, translators 231, 233, 235, 237 and 239 for a target IoT Lamp, PictureFrame, Speaker, Misc, and App(s), respectively. Of course, more or less translators may be devised, depending on the variety of IoT devices. Also, with software sophistication, a single submodule may be developed to perform all of the translator requirements. Next, if a matched group member's IoT does not have a matching IoT type or matching "capability," the translation is performed on the incoming action according to the data container information and then sent via communication channel 250 from SCIS 230 to the respective one or more targets in user group 260.

As various IoT devices have limited functionality, the operation of a touch or voice can be used to alter the IoT device's response. For example, a Lamp capabilities-→Touch/ColorLamp; a Picture Frame capabilities→Touch/ColorDisplay. That is, a touch may produce a change in color (ColorLamp) or Display (ColorDisplay. For a Speaker capabilities→Speaker/Microphone, a sound or audio may be recorded, or played. Of course, these are just a few examples of many possible IoT device responses and others are well known in the art, and are incorporated herein. These actions→results are put into an SCIS compatible data object (see FIG. 1) and processed by the SCIS 210, translated 230 (as needed), forwarded 250 to respective one or more target users/devices 260.

For example, user's touch 205 could be sent to user 285 having both a speaker IoT device 283 and a smart phone 387, running an App (not shown). The respective speaker IoT device 283 making a "translated" sound as well as the smart phone 387 showing to user 285 a translated (visually, email, text, etc.) version of the action/intent of user 285's touch 205. Similarly, if other users 265, 275, 295 are within the same target group, then their respective IoT devices (PictureFrame 263, PictureFrame 277, and SmartPhone 297), respectively would respond with as-needed translated information. For example, user's 265 PictureFrame 263 would blink or show an "incoming" notification, wherein user 265 could "touch" 267 the PictureFrame 263 to access the sent information, status, etc. from user 202. Similarly, user's 295 SmartPhone 297 may have queued up all incoming actions from other users in the SCIS App running on the SmartPhone, and by "touching" 293 the appropriate App indicator, view, hear, etc. user 202's sent action/information.

As a practical example, if a user "Jen" with IoT Speaker has configured it to be voice-activation enabled with a short audio recording to send audio to users in a group. And Jen has NOT configured her personal color in her SCIS App. When Jen says the command to activate/send the audio recording "Good Night, Mom Dad!", the following can happen under the exemplary system:

1. All Speakers (IoT) in the group play the audio recording of "Good Night, Mom Dad!"—originating from Jen's audio clip—and the corresponding users in her group also receive a notification on their Apps indicating there is an audio clip originated from Jen.

2. For all Lamps (IoT) in the group, since Jen did not configure her personal color, the SCIS system can issue, for example, a "soft glowing light" or "pulsing" of the Lamps for a predetermined period, indicating an object is arriving from another IoT device/user. The Lamp signal recipient can then examine their SCIS App to receive the notification from Jen and review the sent audio clip on the App, if so desired. The appropriate translation to the Lamp can be custom configured, SCIS configured, programmed, or default, etc., and therefore may be of another form or combinations of forms than "soft glowing" or "pulsing."

3. For all Picture Frames (IoT) in the group, the SCIS system can apply its translation approach to either transcribe the words sent by Jen to be displayed on the Picture Frames or a notification of some sort (either a text, picture, color, etc.) sent to the Picture Frames indicating to the users/owners that Jen has sent a message. As well as, if so desired, an update to their SCIS App with the sent audio clip for their review on the App. Thus, depending on how the SCIS is configured to perform its "translation," various different schemes of delivering the sent message can be implemented. The exemplary approach enables non-matching IoT capable devices to still perform as a messaging platform under the SCIS system's translation features, as well as provide the original message, if so desired, on the accompanying SCIS App. This ability is well suited for situations where the recipient does not have the "correct" or matching IoT device to the sender's IoT device. Of course, the Translator (or by user configuration) can have the ability to decide which non-matching device to translate to (it may only need to translate to one non-matching device instead of attempting to translate to multiple non-matching devices on the recipient's side—thus avoiding the confusion of 4-5 different IoT devices flashing or messaging).

Other embodiments of the exemplary SCIS system are further detailed given the following new problem statement: A typical smart communicative IoT system focuses on human-operable input mechanisms (e.g., touch, tapping, sliding, clicking on apps, etc.) to trigger an operation (e.g., sending a picture to all IoT devices in a given group, creating an appointment notification to oneself, etc.). That is, the person must perform the triggering action. To address this human-required limitation, the exemplary SCIS system can be configured to operate in a Machine-to-Machine (M2M) manner, interfacing with other "machines" data/formats. That is, with non-human triggered responses, actions, or the like.

Figure 3:
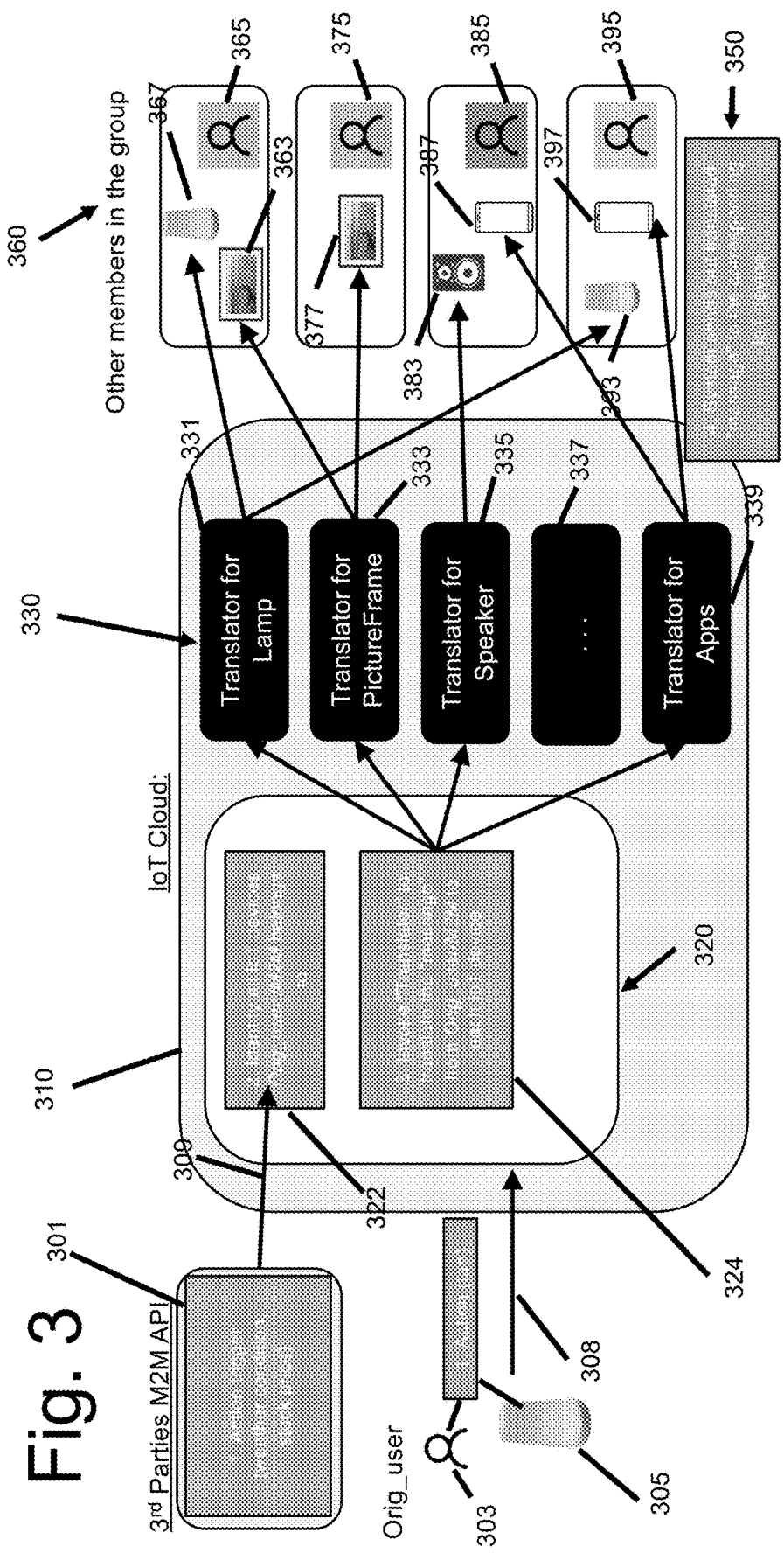
FIG. 3 is a block diagram illustration showing an exemplary SCIS IoT configuration using non-human triggering to convey information, etc. to a variety of IoT devices and their users.

FIG. 3 is a block diagram 300 showing an exemplary M2M SCIS IoT configuration using non-human triggering M2M API 301 to convey information, etc. to a variety 260 of IoT devices and their users. The embodiment of FIG. 3 is a modification of the embodiment seen in FIG. 2, having the M2M SCIS system 310 accommodating actions sent 309 from a "machine/non-human" source 301. Elements 303, 305, 308 are identical to references 202, 205, 208, respectively, as described in FIG. 2. Elements 330, 331, 333, 335, 337, 339, 350-395 are identical to references 230, 231, 233, 235, 237, 239 and 250-259, respectively, as described in FIG. 2. To facilitate this additional input source type, M2M SCIS system 310 contains modules or software routines 320 having submodules for M2M capable identification 322 and M2M translation invocation 324. These submodules 322, 324 act in a similar fashion to the submodules 222, 224 of FIG. 2's embodiment, however, are able to also identify/translate M2M API 301 originated actions. The subsequent submodules and modules and actions, etc. are similar to the counterparts seen in FIG. 2 and reference to their operations are stated in FIG. 2's description. While FIG. 3 shows a combined feature embodiment, it is possible to have an embodiment that is solely dedicated to M2M-initiated actions, if so desired. However, it is believed most commercial implementations will have the hybrid capabilities described.

As a practical and non-limiting example of the capabilities of this embodiment, information from a Weather API, Stock Market API, etc. can be used to trigger an SCIS IoT operation or "speak" to an IoT device connected to the SCIS system. Non-API triggers that are automatic or software based can be utilized.

Such an M2M interactions allows a user to configure a desired response to a Machine-based condition or event. For example, when Rain is forecast in the next 3 hours as obtained from a weather station API, the SCIS system could sparkle/flash blue at a Lamp IoT device 30 min before rain forecast >50%, red if >75%, or alert the user via a connected Speaker IoT device by voicing out a "50% rain probability in the next 3 hours! Please remember to take your umbrella." This could happen in concert with other IoT devices that are not speech capable using the SCIS translation capabilities.

Sports scores (e.g., sparkle/flash color when your team scores), events, news, auctions, Time sensitive events, Stock prices, emergency public notices, police alerts, security, etc. could all be forwarded to a user-located IoT device, smart device/phone, etc. Or the exemplary system could sparkle/flash green/red the respective IoT device and/or smartphone at end of trading day, brightness based on percent change in S&P 500 (or Dow, Nasdaq, Bitcoin, etc.). Of course, numerous other combinations are possible, dependent on the capabilities of the IoT device(s) and design imagination.

Figure 4:
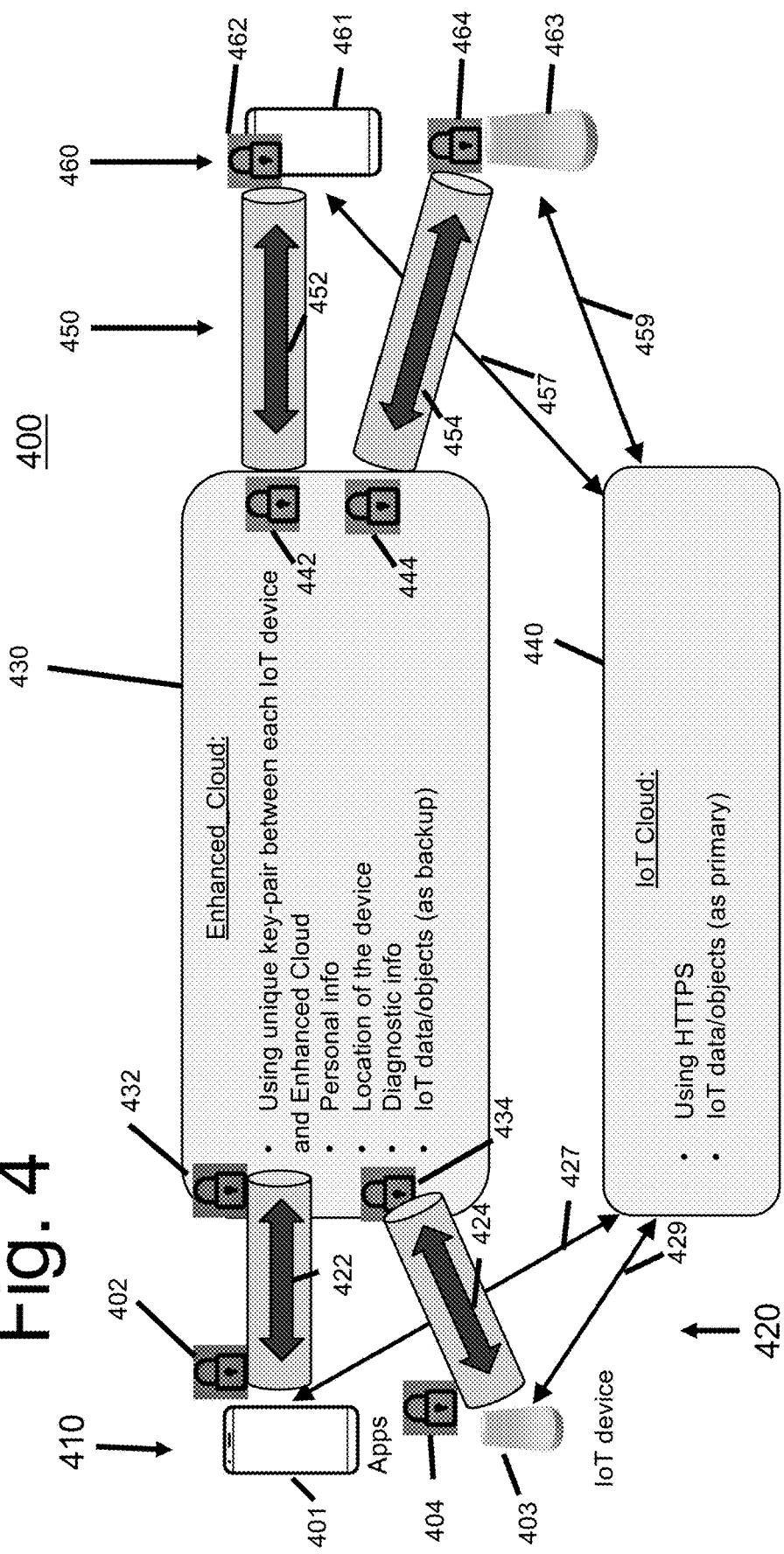
FIG. 4 is a block diagram illustration showing an exemplary SCIS IoT configuration using multiple Cloud topologies/networks for security and performance concerns.

As to security concerns, they can be addressed in an alternative embodiment described in FIG. 4. A typical smart communicative IoT system uses a network identity (e.g., via IoT Cloud) for handling the IoT network-related services and operations. Which is usually under the same protocols and security standards of the IoT Cloud (typically HTTPS). If the IoT Cloud's security protocol is compromised, then the user's IoT system and personal data could be at risk.

An approach to address the above vulnerability can be to have an exemplary SCIS IoT System utilize at least two network entities. Each network entity uses a different security protocol or key than the other network(s). The SCIS system can be configured to use multiple network entities (serially or parallel), by switching, multiplexing by using one with higher security for higher level matters. How each secure network is utilized is a design option, but the ability to have multiple networks that do not have a common security protocol or key, provides a convenient mechanism for protecting a user's information if security is compromised. Also, this enhances the uptime availability of the system if one of the protocols is compromised or being attacked. As a non-limiting example, the extra secure SCIS IoT system could contain:

IoT Cloud(s)—uses HTTPS, for example, as primary protocol for all communications between the IoT Cloud and IoT devices directly or indirectly connected to the IoT Cloud.

Enhanced Cloud(s)—uses VPN with a unique private-public key pair between Enhanced Cloud and IoT devices directly or indirectly connected to the Enhanced Cloud.

IoT SCIS system using one or more above, can use Enhanced Cloud for sensitive data such as, for example, info on location of IoT devices and user(s), name, account, emails, personal, credit, banking, diagnostics, etc.

IoT SCIS system using one or more above, can use IoT Cloud and Enhanced Cloud for IoT objects while keeping IoT Cloud as the primary communication method and Enhanced Cloud as backup and for performance use switching, if needed (e.g., IoT Cloud having less security protocols is understood to be faster but under certain circumstances may become slower, therein Enhanced Cloud may be utilized to offload traffic).

For example, If the protocol used in IoT Cloud(s) is being attacked, the SCIS system can use Enhanced Cloud(s) to stop all communication through IoT Cloud(s) and route all traffic to Enhanced Cloud(s) and vice versa. Instead of having a downtime of the IoT system, SCIS system has built-in backup mechanism to enhance the uptime availability of the system.

FIG. 4 is a block diagram 400 showing an exemplary SCIS IoT configuration using multiple Cloud topologies/networks for the above-described security and performance concerns. 410 represents a sample suite of input/output IoT devices and associated action-generators (M2M/user), 420 the input/output communication channels, 430 and 440 the different networks acting separately, 450 the output/input communication channels and 460 the target IoT devices.

For example, smart phone 401 has an encryption key 402 that is associated with Enhanced Cloud 430 communications 422 from the smart phone 401, with a corresponding encryption key 432. Also or alternatively, smart phone 401 can communicate 427 with IoT Cloud 440 using Internet-based security such as HTTPS, etc. User of IoT device 403 has similar dual network capabilities, sending 424 an "action" coded with encryption key 404 to Enhanced Cloud 430 having decoding encryption key 434. Enhanced Cloud 430 can have unique key-pairing between each IoT device communicating to it, Personal information of the user associated with the communicating IoT device (as well as other IoT devices, the user has), location of the IoT device(s), Diagnostic information, IoT data/objects, Backup data, grouping, and so forth. IoT Cloud 440 can have standard communication security protocol(s), IoT data/objects, information stored. If the Enhanced Cloud 430 is used, then appropriate security keys 442, 462 would set up for communication 452 to target smart phone 461 (acting as an IoT proxy via an App (not shown)); and security keys 444, 464 for communication 454 to target IoT device (touch-sensitive) 463. If the IoT Cloud 440 is used, communication 457, 459 would be utilized to the target devices 457, 459 to target devices 461, 463, using the IoT Cloud 440's communication protocols. Though FIG. 4 shows the IoT Cloud 440 as an HTTPS network, other types of protocols can be used, if so desired. Other combinations may be contemplated, for example, some form of a hybrid communication (portions of the data/action is sent via the Enhanced Cloud and other portions sent via the IoT Cloud).

In view of self-notification capabilities, another embodiment of the exemplary SCIS system is contemplated. For example, the exemplary system can be configured to allow a user to provide "shortcuts" to notifications (self & others). These could, in some instances, be set in the App, for example, sparkle/flash a color on a lamp at a certain time (e.g., sparkle yellow as a reminder to drop the kids off at bus stop). The user can touch the lamp to acknowledge/stop the notification. In some embodiments, a smart plug (Alexa, Google Assistant, etc.) can interface with the IoT device, if handshaking and coordination is facilitated with the SCIS system.

As a non-limiting example, a user (e.g., spouse) can configure a specific action (e.g., a timed sequence of tapping a IoT touch lamp) to trigger a specific "Translator" or API in the SCIS system to perform a preferred notification action. For example, tapping the IoT lamp could set up a message "Pick up kids at 3 pm today" to one more Apps that are associated/configured by the user as well as to IoT devices that the user designates. A 3-tap could signify the default time is 3 pm for pickup and the system would set up reminders to all her IoT devices (or in her proximity), and optionally the message could be sent to the husband's App (if her intent is to instruct her husband to pick the kids up) as well as to his IoT lamp or IoT device (signaling an incoming message in some lamp/device-specific manner and blinking 3 times to inform him the pickup is at 3 pm). The husband could confirm receipt by tapping/touching on his IoT lamp which would in turn respond to the wife's IoT device, or do the same via his App. Alternately, the wife's 4 taps could send the same reminder/notification, but now the time is set to 4 pm.

As another example, all the members of a family could be notified that dinner is at 6 pm, using the wife's short-cut approach by simply "interfacing" with her kitchen-located IoT device. Each family member in their respective rooms/locations would receive this "message" on their devices and each device could signal in their unique way as the appointment time nears. The convenience of using IoT devices to inform the family members, versus the typical yelling into the hallways at dinner time, corralling to get their children to the dinner table.

It goes without saying that this could be used as a self-reminder as well as notifications to others. Variations and changes to how this short-cut reminder/notification approach can be implemented in IoT devices in concert with a "Translator" are understood to be within the purview of one of ordinary skill in the art. Therefore, such modifications are within the scope of this disclosure.

Figure 5:
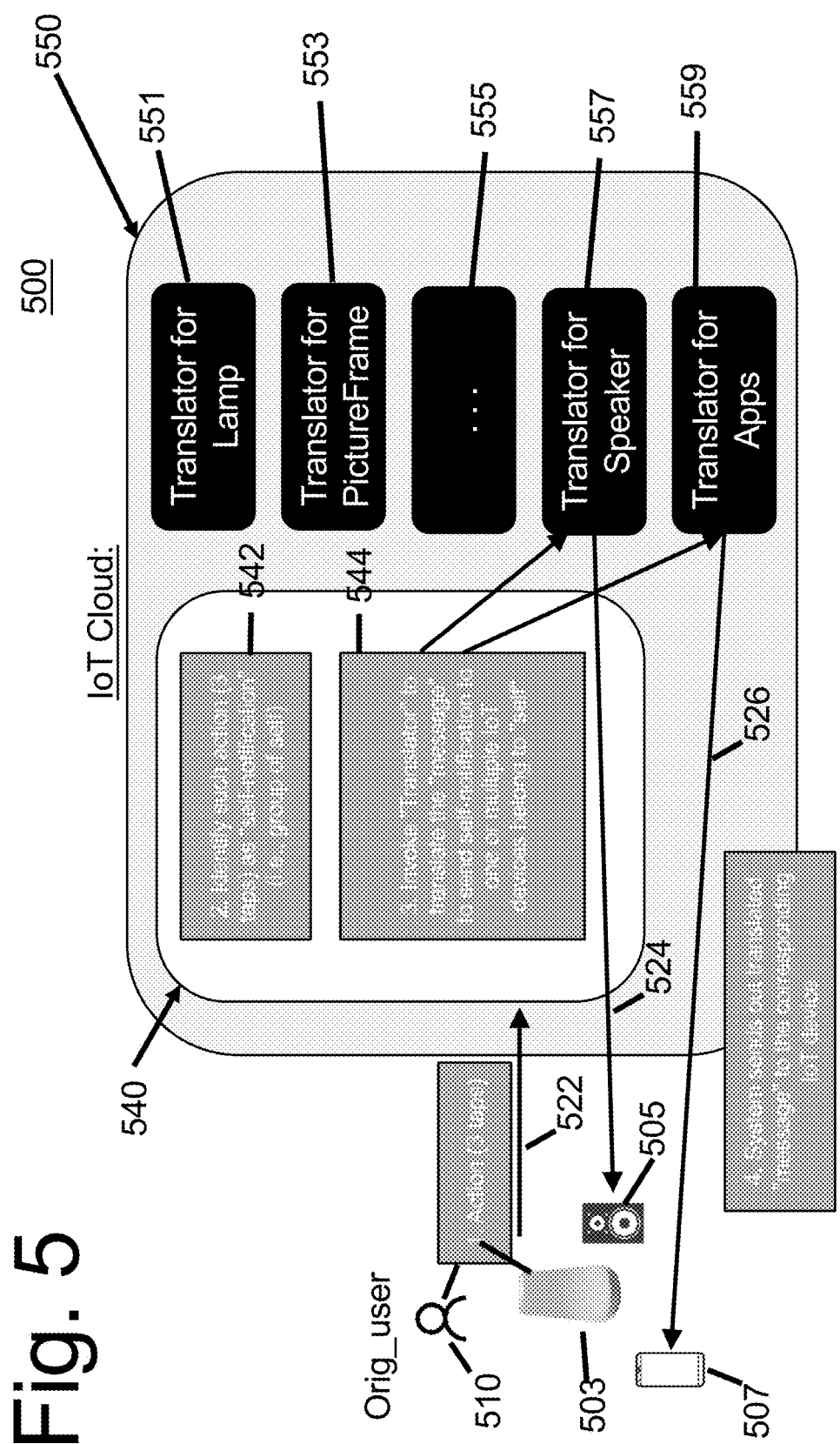
FIG. 5 is a block diagram illustration showing an exemplary SCIS IoT system utilizing short-cut actions to generate notifications/reminders and to the respective IoT devices.

FIG. 5 is a block diagram 500 showing an exemplary SCIS IoT system utilizing short-cut actions to generate notifications/reminders and to the respective IoT devices. It is noted that while this FIG. is in the context of a self-notification, it can be easily adapted to provide short-cut generated notifications to others, depending on how the user configures the system. In operation, a user 510's touch 503 can trigger an action 522 from the user's IoT speaker 505 or smart phone 507, for example. The action 522 is forwarded to the SCIS 550 which has an evaluation module 540 for processing the incoming action 522 (may be formulated as a data container, or may "add" data container information, as needed) through submodules 542 and 544. Submodule 542 identifies the type of action received, etc. (similar to previous embodiments), and if the action indicates a "reminder" back to the user 510 (or group, as designated by the user 510), invokes the next Submodule 544 to perform the appropriate translations (551, 553, 555, 557, 559) and messaging to IoT device(s) associated with the user/self. In this example, since user 510 is associated with IoT speaker 505 and smart phone/App 507, translators for speaker 557 and translator for App 559 are invoked and the "reminder" is forwarded 524, 526 back to these devices. In other scenarios, such a reminder can be pre-set or configured to also remind others (not shown) of the same or equivalent reminder being set by the originating user.

In view of the different embodiments and operational scenarios described above, it is understood one of ordinary skill in the art may, upon understanding the above systems, etc., devise various combinations, changes, modifications to arrive at new and novel system configurations and uses, not explicitly described herein. Therefore, such modifications may be devised without departing from the spirit and scope of this disclosure.

As is apparent from the above, various modifications and changes may be devised by one of ordinary skill in the art. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An Internet of Things (IoT) communication system, comprising:
 a cloud network with a cloud-connected server running an IoT application, the IoT application having registered users' accounts, wherein various registered users have IoT devices of at least one of like type and non-like types and wherein registered users' are grouped into user-linked communication groups by the users, the IoT application also having an Identification submodule cataloging registered users' IoT device types and capabilities and their user-linked communication groups, a Translation Invoking submodule, and at least one or more Translator submodules that convert actions from a first type IoT device to a second dissimilar action of non-like type IoT devices in accordance to conversion selections by the users;

an originating IoT device corresponding to a first registered user's IoT device having a first response, connected to the cloud network and in communication to the IoT application, wherein the first response is triggered by an initiating user's action on the originating IoT device;

a target IoT device corresponding to a second registered user's IoT device having a second response, connected to the cloud network and in communication to the IoT application, wherein the second registered user is in a user-linked communication group with the first registered user;

an IoT App installed on the originating IoT device, connected to the cloud network, wherein the IoT App encases the first response into a data object containing information of at least one of text, the first response, video, and image corresponding to the initiating user's action; and an IoT App installed on a smart device of the second registered user, connected to the cloud network and providing a notification to the second registered user of information in the data object, wherein non-like type target IoT devices exhibit one or more second dissimilar actions defined by the Translator submodules to convey one or more communications to other users.

2. The IoT communication system of claim 1, further comprising a non-human-generated third response, connected to the cloud network, wherein the data object further includes the third response and the at least one or more Translator modules operates on the third response upon a non-like type IoT device match to the second response.

3. The IoT communication system of claim 2, further comprising an application programming interface (API) to trigger the third response.

4. The IoT communication system of claim 3, wherein the third response contains information of at least one of weather, stocks, sports, finances, traffic, emergency, security and event change.

5. The IoT communication system of claim 1, further comprising a plurality of target IoT devices, wherein one group of the plurality of target IoT device have matching responses and another group of the plurality of target IoT devices have non-matching responses.

6. The IoT communication system of claim 5, wherein at least one of the originating IoT device and target IoT device is an IoT lamp, or IoT picture frame, or IoT display, or IoT speaker, or IoT microphone, or IoT smartphone.

7. The IoT communication system of claim 1, wherein the cloud network is an Internet Cloud.

8. The IoT communication system of claim 1, further comprising a second network, the second network having at least one of a security protocol and key different from the cloud network, and also connected to the IoT App.

9. The IoT communication system of claim 8, further comprising a non-human-generated third response, connected to the cloud and second network, wherein the data object includes the third response and the at least one or more Translator modules operates on the third response upon a non-like type IoT device match to the second response.

10. The IoT communication system of claim 1, wherein the smart device is a smart phone.

11. The IoT communication system of claim 1, further comprising a reminder from the originating IoT device and communicated by the IoT application to at least one of the originating IoT device and to the IoT App.

12. An Internet of Things (IoT) device communication method, comprising:

running an IoT application on a server connected to a first network, the IoT application having registered users' accounts, wherein registered users have IoT devices of at least one like type and non-like types and wherein registered users' are grouped into user-linked communication groups by the users, the IoT application also having an Identification submodule cataloging registered users' IoT device types and capabilities and their user-linked communication groups, a Translation Invoking submodule, and at least one or more Translator submodules that convert a first response from an initiating IoT device to a dissimilar response from an non-like type target IoT device in accordance to registered users' selections;

triggering the first response of an originating IoT device from an initiating user's action, the originating IoT device being connected to the first network;

communicating the first response to the IoT application;

encapsulating at least one of text, the first response, video, and image corresponding to the initiating user's action into a data object;

converting information in the data object to a format compatible with one or more target IoT devices, connected to the network, upon a non-like type target IoT device determination by the IoT application;

communicating at least one of the first response and converted first response to the one or more target IoT devices that have a non-similar function to the originating device; and sending a notification to an IoT App installed on a target user's smart device, of information in the data object, the target user being in a user-linked communication group with the initiating user, wherein the method transforms the user's IoT action to provide a non-analogous mode of communication between users.

13. The IoT device communication method of claim 12, further comprising connecting a second secure network having a different protocol from the first network to the IoT application, originating IoT device, one or more target IoT devices, and the IoT App.

14. The IoT device communication method of claim 13, further comprising choosing between the first and second network as a primary communication path based on a determination of a security breach from the first network.

15. The IoT device communication method of claim 12, further comprising:

connecting a non-human initiating source to the first network;

sending a third response from the non-human initiating source to the IoT application;

encapsulating the third response into the data object;

translating the third response if not matching to the second response; and communicating at least at least one of the third response and translated third response to the one or more target IoT devices.

16. The IoT device communication method of claim 15, further comprising triggering the third response from an application programming interface (API) running on the non-human initiating source.

17. The IoT device communication method of claim 16, wherein the triggering is based on a threshold determination from at least one of weather, stocks, sports, finances, traffic, emergency, security and event change.

18. The IoT device communication method of claim 12, further comprising:

receiving a reminder from the originating IoT device; and communicating the reminder from the IoT application to at least one of the originating IoT device and a secondary device of the initiating user, at a predetermined time.

19. The IoT device communication method of claim 11, wherein at least one of the originating IoT device and target IoT device is an IoT lamp, or IoT picture frame, or IoT display, or IoT speaker, or IoT microphone, or IoT smartphone.

* * * * *